US012207253B2

United States Patent
Matsumura et al.

(10) Patent No.: US 12,207,253 B2
(45) Date of Patent: Jan. 21, 2025

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 567 days.

(21) Appl. No.: 17/602,635

(22) PCT Filed: Apr. 8, 2020

(86) PCT No.: PCT/JP2020/015797
§ 371 (c)(1),
(2) Date: Oct. 8, 2021

(87) PCT Pub. No.: WO2020/209282
PCT Pub. Date: Oct. 15, 2020

(65) Prior Publication Data
US 2022/0167378 A1    May 26, 2022

(30) Foreign Application Priority Data
Apr. 9, 2019    (JP) ................................ 2019-084682

(51) Int. Cl.
*H04W 72/1273*    (2023.01)
*H04L 5/00*    (2006.01)
(Continued)

(52) U.S. Cl.
CPC ....... *H04W 72/1273* (2013.01); *H04L 5/0051* (2013.01); *H04L 5/0053* (2013.01); *H04W 72/044* (2013.01); *H04W 72/23* (2023.01)

(58) Field of Classification Search
None
See application file for complete search history.

(56) References Cited

U.S. PATENT DOCUMENTS

| 11,115,973 B2 * | 9/2021 | Jin ........................ H04W 72/23 |
| 2019/0045488 A1 * | 2/2019 | Park ...................... H04L 5/0048 |

(Continued)

OTHER PUBLICATIONS

Office Action issued in the counterpart Chinese Patent Application No. 202080042283.X, mailed on Apr. 28, 2023 (12 pages).
(Continued)

*Primary Examiner* — Lance Leonard Barry
(74) *Attorney, Agent, or Firm* — Osha Bergman Watanabe & Burton LLP

(57) ABSTRACT

A user terminal according to an aspect of the present disclosure includes a receiving section that receives downlink control information (DCI) used for scheduling of a plurality of downlink shared channels with different antenna port groups for a demodulation reference signal, and a control section that, when information indicating that a certain field that indicates a transmission configuration indication (TCI) state is present in the DCI is not configured, commonly or individually controls a TCI state of each of the plurality of downlink shared channels. According to one aspect of the present disclosure, it is possible to preferably perform DL communication even when multiple panels/TRPS are used.

2 Claims, 15 Drawing Sheets

(51) Int. Cl.
*H04W 72/044* (2023.01)
*H04W 72/23* (2023.01)

(56) References Cited

U.S. PATENT DOCUMENTS

| | | | | |
|---|---|---|---|---|
| 2019/0342907 | A1* | 11/2019 | Huang | H04W 72/23 |
| 2021/0135821 | A1* | 5/2021 | Guan | H04L 5/0048 |
| 2021/0274537 | A1* | 9/2021 | Lee | H04W 72/543 |
| 2022/0104237 | A1* | 3/2022 | Muruganathan | H04L 5/0023 |
| 2022/0158805 | A1* | 5/2022 | Frenne | H04W 72/23 |

OTHER PUBLICATIONS

Written Opinion for corresponding International Application No. PCT/JP2020/015797, mailed Jun. 16, 2020 (4 pages).
International Search Report for corresponding International Application No. PCT/JP2020/015797, mailed Jun. 16, 2020 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
ZTE; "Considerations on beam management for multi-TRP"; 3GPP TSG RAN WG1 #96bis, R1-1904021; Xi'an, China; Apr. 8-12, 2019 (7 pages).
Nokia et al.; "Enhancements on Multi-TRP/Panel Transmission"; 3GPP TSG RAN WG1 #96bis, R1-1905064; Xi'an, China; Apr. 8-12, 2019 (6 pages).
Office Action issued in the counterpart Japanese Patent Application No. 2021-513665, mailed on Feb. 7, 2023 (7 pages).
Nokia, Nokia Shanghai Bell; "Feature lead summary on Cross-carrier Scheduling with Different Numerologies"; 3GPP TSG RAN WG1 Meeting #96, R1-1903695; Athens, Greece; Feb. 25-Mar. 1 (19 pages).
ZTE Corporation; "Discussion on cross-carrier scheduling with different numerologies"; 3GPP TSG RAN WG1 Meeting #96bis, R1-1904154; Xi'an, China; Apr. 8-12, 2019 (8 pages).
Office Action issued in counterpart Indian Patent Application No. 202117047740 mailed on Jan. 17, 2024 (8 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (hereinafter also referred to as NR), a user terminal (User Equipment (UE)) that controls, on the basis of information related to quasi-co-location (QCL) of at least one of a signal and a channel (expressed by a signal/channel), reception processing (e.g., demapping, demodulation, decoding, forming a receiving beam, and the like) and a transmitting process (e.g., mapping, modulation, coding, precoding, forming a transmitting beam, and the like) of the signal/channel is under study.

For NR, one or a plurality of transmission/reception points (TRPs) (multiple TRPs) that perform, using one or a plurality of panels (multiple panels), a DL transmission (e.g., a PDSCH transmission), (also referred to as multiple panels/TRPs and so on) to a UE are also under study.

However, when the multiple panels/TRPs are introduced, it may not appropriately control a QCL assumption for a plurality of DL signals (e.g., a plurality of PDSCHs) that are transmitted from different panels or different TRPs. Consequently, a gain (e.g., a spatial diversity gain or the like) from the multiple panels/TRPs may not be appropriately obtained.

Thus, an object of the present disclosure is to provide a user terminal and a radio communication method that can preferably perform DL communication even when multiple panels/TRPs are used.

Solution to Problem

A user terminal according to an aspect of the present disclosure includes a receiving section that receives downlink control information (DCI) used for scheduling of a plurality of downlink shared channels with different antenna port groups for a demodulation reference signal, and a control section that, when information indicating that a certain field that indicates a transmission configuration indication (TCI) state is present in the DCI is not configured, commonly or individually controls a TCI state of each of the plurality of downlink shared channels.

Advantageous Effects of Invention

According to one aspect of the present disclosure, it is possible to preferably perform DL communication even when multiple panels/TRPs are used.

DESCRIPTION OF EMBODIMENTS (QCL/TCI)

Figure 1:
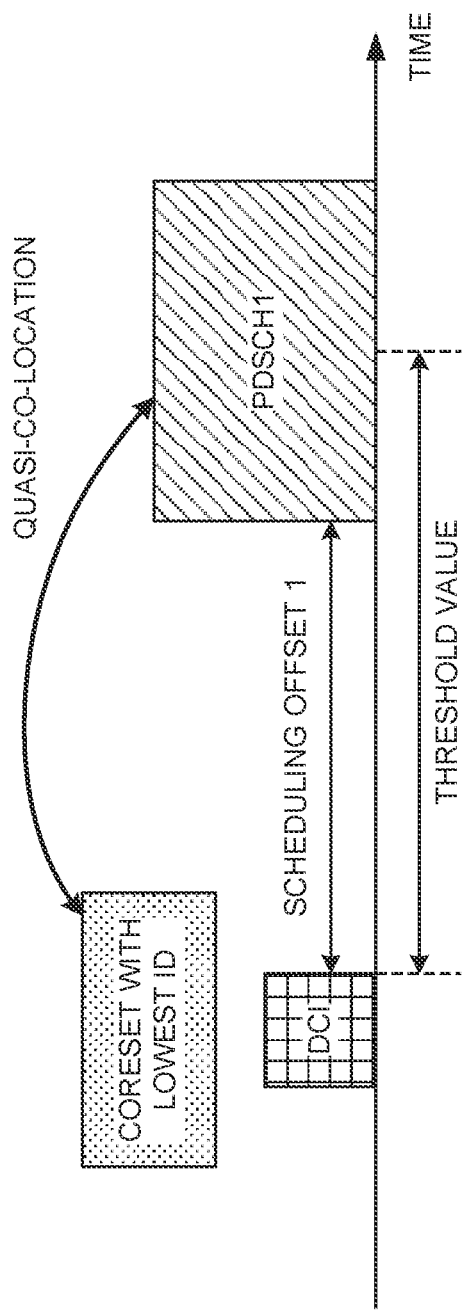
FIG. 1 is a diagram to show an example of a determination of a TCI state of a PDSCH.

For NR, controlling reception processing (e.g., at least one of reception, demapping, demodulation, decoding) of at least one of a signal and a channel (expressed by a signal/channel) on the basis of a transmission configuration indication (Transmission Configuration Indication or indicator (TCI)) state (TCI state) is under study.

Here, the TCI state is information related to quasi-co-location (QCL) of the signal/channel, and may be referred to as a spatial reception parameter, spatial relation information (spatial relation info), or the like. The TCI state may be configured for a UE for each channel or each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified on the basis of spatial QCL. The QCL (or at least one element in the QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) are described below:

QCL type A: Doppler shift, Doppler spread, average delay, and delay spread
QCL type B: Doppler shift and Doppler spread
QCL type C: Doppler shift and average delay
QCL type D: Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel on the basis of the TCI state or the QCL assumption of the signal/channel.

The TCI state may be, for example, information related to QCL between a channel as a target (or a reference signal (RS) for the channel) and another signal (for example, another downlink reference signal (DL-RS)). The TCI state may be configured (indicated) by higher layer signaling, physical layer signaling, or a combination of these.

In the present disclosure, the higher layer signaling may be, for example, any one of radio resource control (RRC) signaling, Medium Access Control (MAC) signaling, broadcast information, and the like, or a combination of these. Note that the higher layer signaling may be rephrased as a higher layer parameter (e.g., an RRC parameter, a MAC parameter, and so on).

The MAC signaling may use, for example, a MAC control element (CE), a MAC protocol data unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), and a sounding reference signal (SRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured by higher layer signaling may include one or a plurality of pieces of QCL information ("QCL-Info"). The QCL information may include at least one of information related to the DL-RS to have a QCL relationship (DL-RS relation information) and information indicating a QCL type (QCL type information). The DL-RS-related information may include information of an index of the DL-RS (for example, an SSB index or a non-zero power CSI-RS resource ID), an index of a cell in which the RS is located, an index of a BWP (Bandwidth Part) in which the RS is located, and the like.

<TCI State for PDCCH>

Information related to QCL between the PDCCH (or a DMRS port or the DMRS port group that is related to the PDCCH) and a certain DL-RS may be referred to as the TCI state for the PDCCH and so on. Note that the DMRS port may be an antenna port for a demodulation reference signal (DMRS). A group including one or more DMRS ports may be referred to as a DMRS port group, an antenna port group and so on.

The UE may judge the TCI state for the UE-specific PDCCH (CORESET) on the basis of higher layer signaling.

For example, for each CORESET, one or a plurality of (K) TCI states may be configured for the UE by RRC signaling (e.g., "tci-StatesPDCCH-ToAddList" in an RRC control element (Information Element (IE)) "ControlResourceSet").

The UE may activate one or a plurality of TCI states with respect to each CORESET by using a MAC CE. The MAC CE may be referred to as a TCI state indication for UE-specific PDCCH MAC CE. The UE may monitor a CORESET on the basis of an active TCI state corresponding to the CORESET.

<TCI State for PDSCH>

Information related to QCL between the PDSCH (or a DMRS port or the DMRS port group that is related to the PDSCH) and a certain DL-RS may be referred to as the TCI state for the PDSCH and so on.

M (M≥1) pieces of TCI states (M pieces of QCL information for the PDSCH) for the PDSCH may be notified to (configured for) the UE by higher layer signaling. Note that the number M of the TCI states configured for the UE may be limited by at least one of UE capability and a QCL type.

Downlink control information (DCI) used for scheduling of a PDSCH may include a certain field (which may be referred to as, for example, a TCI field, a TCI state field, and so on) indicating the TCI state for the PDSCH. The DCI may be used for scheduling of a PDSCH in one cell, and may be referred to as, for example, DL DCI, DL assignment, DCI format 1_0, DCI format 1_1, and so on.

Information notified to the UE from a base station may control whether the TCI field is included in the DCI. The information may be information (TCI presence information) that indicates whether the TCI field is present or absent in the DCI. The information may be configured for the UE by, for example, higher layer signaling (e.g., an RRC IE "TCI-PresentInDCI"). The TCI presence information may be configured for each CORESET.

When the DCI includes an x-bit (e.g., x=3) TCI field, the base station may preconfigure at most $2^x$ (e.g., 8 when x=3) kinds of the TCI states for the UE by using higher layer signaling. A value (code point) of the TCI field in the DCI may be associated with the TCI state configured by the higher layer signaling.

When TCI states with over 8 kinds of TCI states are configured for the UE, TCI states with 8 or less kinds of TCI states may be activated (or specified) by using a MAC CE. The MAC CE may be referred to as TCI states activation/deactivation for UE-specific PDSCH MAC CE. The value of the TCI field in the DCI may indicate one of the TCI states activated by the MAC CE.

The MAC CE is used for specifying, in a TCI state ID configured by RRC signaling, a TCI state to be mapped to a code point of the TCI field in the DCI and activating the specified TCI state. The activated TCI state may be mapped to code point values 0 to $2^x-1$ (e.g., 7 when x=3) of the above-described TCI field in ascending or descending order of the TCI state ID.

When a slot in which the UE transmits delivery confirmation information (Hybrid Automatic Repeat reQuest ACKnowledgement (HARQ-ACK)) for the PDSCH that has provided the above-described MAC CE is denoted by n, activation/deactivation (mapping between the TCI field in the DCI and the TCI state) based on the MAC CE may be applied from slot n+3*(the number of slots in a subframe)+1. In other words, in the slot n+3*(the number of slots in a subframe)+1, an update on the code point of the TCI field based on the above-described MAC CE may be enabled.

When a time offset between reception of DL DCI and reception of a PDSCH corresponding to the DCI is equal to or greater than a certain threshold value, the UE may assume that the DMRS ports of a PDSCH of a serving cell are QCL with the RS(s) in the TCI state with respect to QCL type parameter(s) given by the TCI state indicated by the DCI ("the DM-RS ports of PDSCH of a serving cell are quasi co-located with the RS(s) in the TCI state with respect to the QCL type parameter(s) given by the indicated TCI state").

The time offset between reception of DL DCI and reception of a PDSCH corresponding to the DCI may be referred to as a scheduling offset.

The above-described certain threshold value may be referred to as "Threshold," "Threshold for offset between a DCI indicating a TCI state and a PDSCH scheduled by the DCI," "Threshold-Sched-Offset," a schedule offset threshold value, a scheduling offset threshold value, and so on.

The certain threshold value may be based on UE capability, and may be based on, for example, a delay in PDCCH decoding and beam switching. Information related to the certain threshold value may be configured using higher layer signaling from the base station, or may be transmitted from the UE to the base station.

When the scheduling offset is less than a certain threshold value, the UE may assume that the DMRS ports of a PDSCH of a serving cell are QCL with the RS(s) in the TCI state with respect to QCL parameter(s) used for PDCCH QCL indication that corresponds to the lowest CORESET-ID in the latest (most recent) slot in which one or more CORESETs within an active Bandwidth Part (BWP) of the serving cell are configured for the UE (the DM-RS ports of PDSCH of a serving cell are quasi co-located with the RS(s) in the TCI state with respect to the QCL parameter(s) used for PDCCH quasi co-location indication of the lowest CORESET-ID in the latest slot in which one or more CORESETs within the active BWP of the serving cell are configured for the UE).

For example, the UE may assume that the DMRS ports of the PDSCH are QCL with the DL-RS that is based on the TCI state activated with respect to a CORESET corresponding to the above-described lowest CORESET-ID. The latest slot may be, for example, a slot that receives DCI for scheduling the PDSCH.

Note that the CORESET-ID may be an ID (ID for CORESET identification) configured by an RRC information element "ControlResourceSet."

FIG. 1 is a diagram to show an example of a determination of the TCI state of the PDSCH. In the present example, the scheduling offset is less than the scheduling offset threshold value. Accordingly, the UE may assume that the DMRS ports of the PDSCH are QCL with the RS (e.g., a DMRS for a PDCCH) in the TCI state for a PDCCH that corresponds to the lowest CORESET-ID in the latest slot.

(Multiple TRPS/Panels)

For NR, one or a plurality of transmission/reception points (TRPs), (multiple TRPs) that perform a DL transmission (e.g., a PDSCH transmission) to the UE by using one or a plurality of panels (multiple panels) are under study.

Figure 2A:
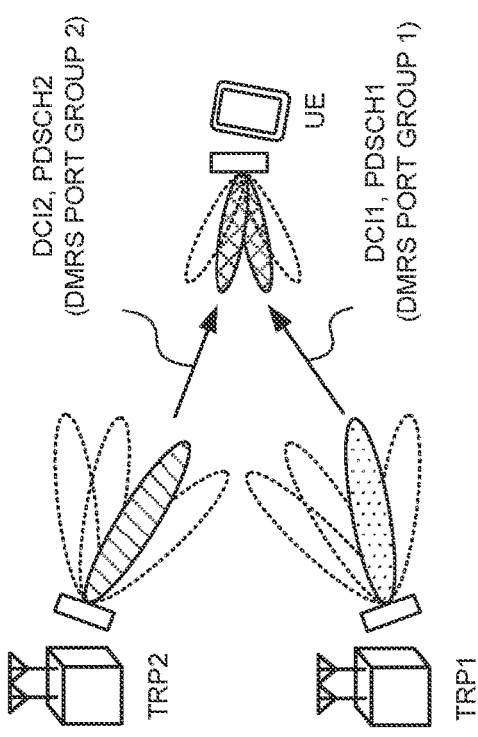
FIGS. 2A to 2D are diagrams to show examples of a scenario for multiple panels/TRPs.
Figure 2B:
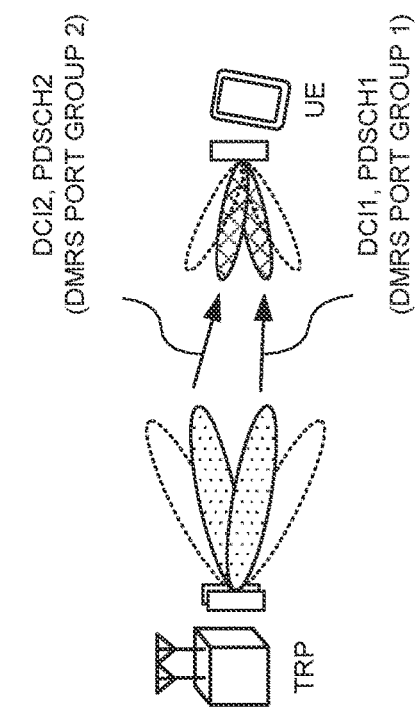
Figure 2C:
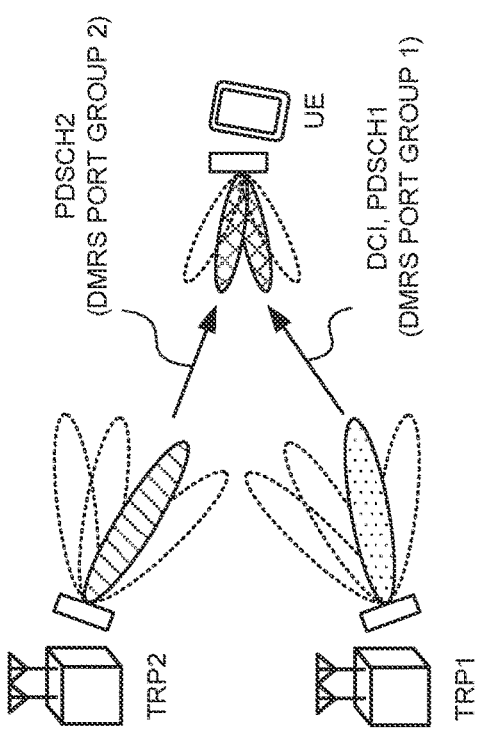
Figure 2D:
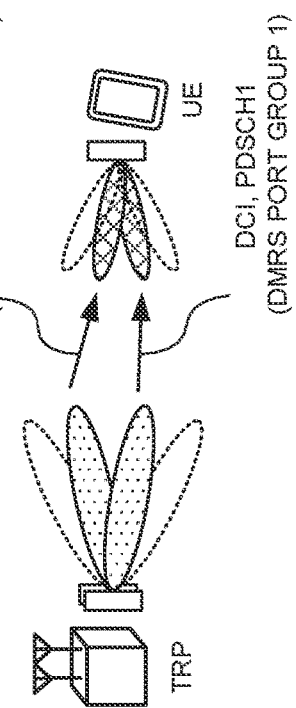

FIGS. 2A to 2D are diagrams to show examples of a scenario for multiple panels/TRPs. FIGS. 2A and 2C show an example in which one TRP transmits a PDCCH and a PDSCH to the UE by using multiple panels. FIGS. 2B and 2D show an example in which two TRPs (TRPs 1 and 2) transmit a PDCCH and a PDSCH to the UE. In these examples, although it is assumed that each TRP can transmit four different beams, the present disclosure is not limited to this. A plurality of TRPs (here, the TRPs 1 and 2) may be connected by an ideal backhaul or a non-ideal backhaul.

FIGS. 2A and 2B correspond to an example in which a plurality of PDCCHs is used for scheduling of a plurality of PDSCHs. The UE receives DCI 1 that is transmitted from a panel 1 (or TRP 1) and a PDSCH 1 (codeword 1) in which a schedule is indicated by the DCI 1. The UE receives DCI 2 that is transmitted from a panel 2 (or TRP 2) and a PDSCH 2 (codeword 2) in which a schedule is indicated by the DCI 2.

FIGS. 2C and 2D correspond to an example in which one PDCCH (single PDCCH) is used for scheduling of a plurality of PDSCHs. The UE receives one piece of DCI that is transmitted from any one of the panel 1 (or TRP 1) and panel 2 (or TRP 2). The UE receives the PDSCH 1 (codeword 1) that is transmitted from the panel 1 (or TRP 1) and in which a schedule is indicated by the DCI. The UE receives the PDSCH 2 (codeword 2) that is transmitted from the panel 2 (or TRP 2) and in which a schedule is indicated by the DCI.

Note that the plurality of panels in FIGS. 2A and 2C and the plurality of TRPs in FIGS. 2B and 2D may be rephrased as a plurality of DMRS port groups. The UE may acknowledge a different panel or a different TRP using a different DMRS port group or other information (e.g., a configuration information (e.g., an RRC IE "PDCCH-Config") for a different CORESET or a different PDCCH, or a different search space set).

According to such a scenario for the multiple panels/TRPs, it is possible to control transmission using a high-quality channel with more flexibility.

However, when the multiple panels/TRPs are introduced, it may not appropriately control a QCL assumption for a plurality of PDSCHs (with different DMRS port groups) that are transmitted from different panels or different TRPs. Specifically, it may not be possible for the UE to appropriately determine the TCI state of the plurality of PDSCHs in a case of a single PDCCH (e.g., see FIGS. 2C and 2D) for scheduling the plurality of PDSCHs by using a single piece of DCI.

Thus, the inventors of the present invention studied a method for appropriately determining a TCI state of a plurality of PDSCHs in a case where the plurality of PDSCHs (with different DMRS port groups) that are transmitted from different panels or different TRPs is scheduled by a single piece of DCI, thereby accomplishing the present invention.

Embodiments according to the present disclosure will be described in detail below with reference to the drawings.

Note that in the present disclosure, the term "DMRS port group" may be interchangeably rephrased as a TRP, a panel, a group (CDM group) of DMRS ports in which code division multiplexing (CDM) is implemented, an antenna port group, a group (RS related group) related to a reference signal (RS), and so on.

Depending on a type of the DMRS port group, a transmission pattern (e.g., one of a plurality of panels and a plurality of TRPs, or which one of an ideal backhaul and a non-ideal backhaul connects a plurality of TRPs) of a plurality of PDSCHs may be identified.

A cell ID and a cell (serving cell) may be interchangeably interpreted. An ID, an index, and a number may be interchangeably interpreted. A cell may be interchangeably rephrased as a serving cell, a carrier, a CC, and so on. The terms "expect" and "assume" may be interchangeably rephrased. A code point may be rephrased as a value. DCI and a PDCCH may be interchangeably rephrased.

A TCI state may be interchangeably rephrased as a QCL assumption, QCL, a QCL relationship, and so on. A TCI state of a PDSCH or a PDCCH may be rephrased as a TCI state of a DMRS port group of the PDSCH or the PDCCH, and may indicate a downlink reference signal resource (e.g., an SSB or a CSI-RS resource) that is in the QCL relationship with the DMRS port group of the PDSCH or the PDCCH.

Although first to third aspects below show an example case where a scheduling offset between reception of a single piece of DCI for scheduling a plurality of PDSCHs with different DMRS port groups and reception of at least one of the plurality of PDSCHs is equal to or greater than a certain threshold value (e.g., Threshold-Sched-Offset) or is greater than the certain threshold value, the present disclosure in not limited to this. The first to third aspects may be employed independently of a relationship between the scheduling offset and the certain threshold value.

(First Aspect)

In a first aspect, when TCI presence information (e.g., an RRC IE "TCI-PresentInDCI") is not configured, a UE does not have to expect reception of DCI used for scheduling of a plurality of PDSCHs with different DMRS port groups. Note that the UE may be in a connected mode (also referred to as an RRC connected mode and so on).

In other words, when receiving DCI used for scheduling of a plurality of PDSCHs with different DMRS port groups via a PDCCH with a specific DMRS port group (e.g., see a single PDCCH in FIGS. 2C and 2D), it may be assumed that the TCI presence information is configured for the UE.

The TCI presence information may indicate that a TCI field is present in the DCI (or may be set to "enabled").

Figure 3:
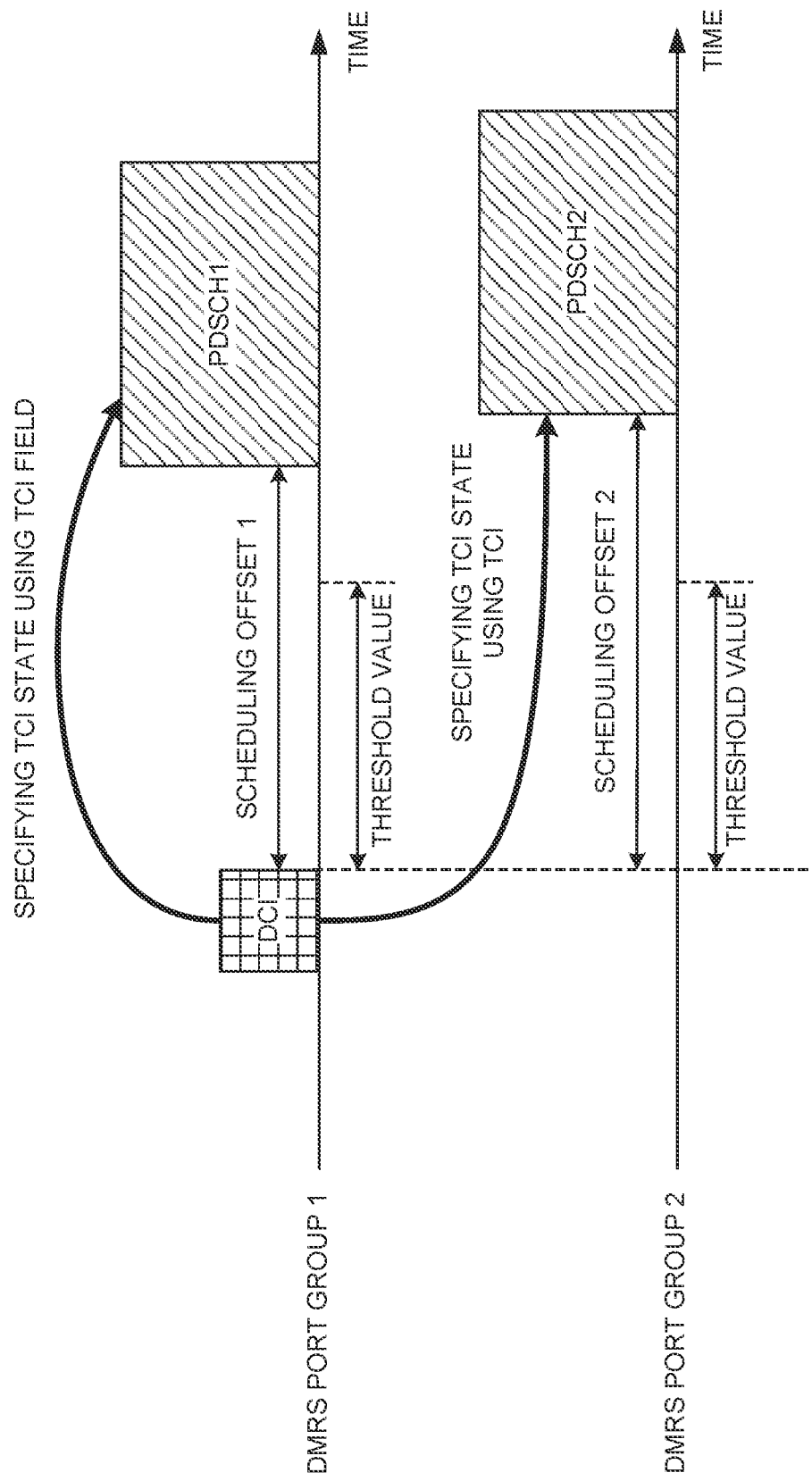
FIG. 3 is a diagram to show an example of a determination of a TCI state according to a first aspect.

FIG. 3 is a diagram to show an example of a determination of a TCI state according to the first aspect. In FIG. 3, the UE (e.g., a UE in the connected mode) is assumed to receive TCI presence information indicating presence of a TCI field in DCI.

In FIG. 3, the UE is assumed to receive DCI for scheduling a plurality of PDSCHs associated with a plurality of different DMRS port groups (here, DMRS port groups 1 and 2) via a PDCCH associated with (corresponding to) a specific DMRS port group (here, a DMRS port group 1).

As shown in FIG. 3, a time offset (scheduling offsets 1 and 2) between reception of the DCI and reception of each of the plurality of PDSCHs may be equal to or greater than a certain threshold value (e.g., Threshold-Sched-Offset) or may be greater than the certain threshold value.

In a case shown in FIG. 3, the UE may determine a TCI state of PDSCHs 1 and 2 with each of the DMRS port groups 1 and 2 on the basis of a value of the TCI field in DCI that is received via the PDCCH with the DMRS port group 1. Specifically, the UE may assume that the TCI state of the PDSCHs 1 and 2 is the same as a TCI state indicated by the value of the TCI field in the DCI.

Note that in FIG. 3, it may be assumed that the TCI presence information is configured for the UE with respect to a CORESET with which a search space set for monitoring the DCI is associated. When the TCI presence information is not configured, how the UE determines a TCI state of a PDSCH associated with a DMRS port group that is different from the specific DMRS port group may depend on UE implementation (up to UE implementation).

In the first aspect, a network (e.g., a base station) notifies (transmits) the UE of the TCI presence information indicating that DCI for scheduling a plurality of PDSCHs with different DMRS port groups includes a TCI field. The network sets a value indicating a TCI state of each of the plurality of PDSCHs for the TCI field in the DCI. Therefore, it is possible for the UE to appropriately determine the TCI state of the plurality of PDSCHs on the basis of the value of the TCI field in the DCI.

(Second Aspect)

In a second aspect, when a plurality of PDSCHs with different DMRS port groups is scheduled by a single piece of DCI, a UE may assume that a TCI state of each of the plurality of PDSCHs is based on a same QCL assumption.

Specifically, when TCI presence information (e.g., an RRC IE "TCI-PresentInDCI") indicating presence of a TCI field in the DCI is not configured, the UE may commonly control the TCI state of each of the above-described plurality of PDSCHs.

For example, the UE may determine the TCI state of each of the plurality of PDSCHs on the basis of at least one of a CORESET used for transmission of the above-described DCI (a first determination of a TCI state), a specific code point of the TCI field (a second determination of a TCI state), and a specific TCI state that is associated with a DMRS port group of each of the plurality of PDSCHs (a third determination of a TCI state).

<First Determination of TCI State>

In the first determination of the TCI state, the UE may determine, on the basis of a CORESET for DCI for scheduling a plurality of PDSCHs with different DMRS port groups, the TCI state of each of the plurality of PDSCHs.

Specifically, the UE may assume that the TCI state of each of the plurality of PDSCHs is the same as a TCI state applied for the CORESET. The TCI state applied for the CORESET may be specified by at least one of an RRC parameter (e.g., an RRC IE "tci-State") and a MAC CE.

Note that when one or more TCI states are configured for the CORESET by a higher layer parameter, the TCI state applied for the above-described CORESET may be a single TCI state that is activated by the MAC CE.

Figure 4:
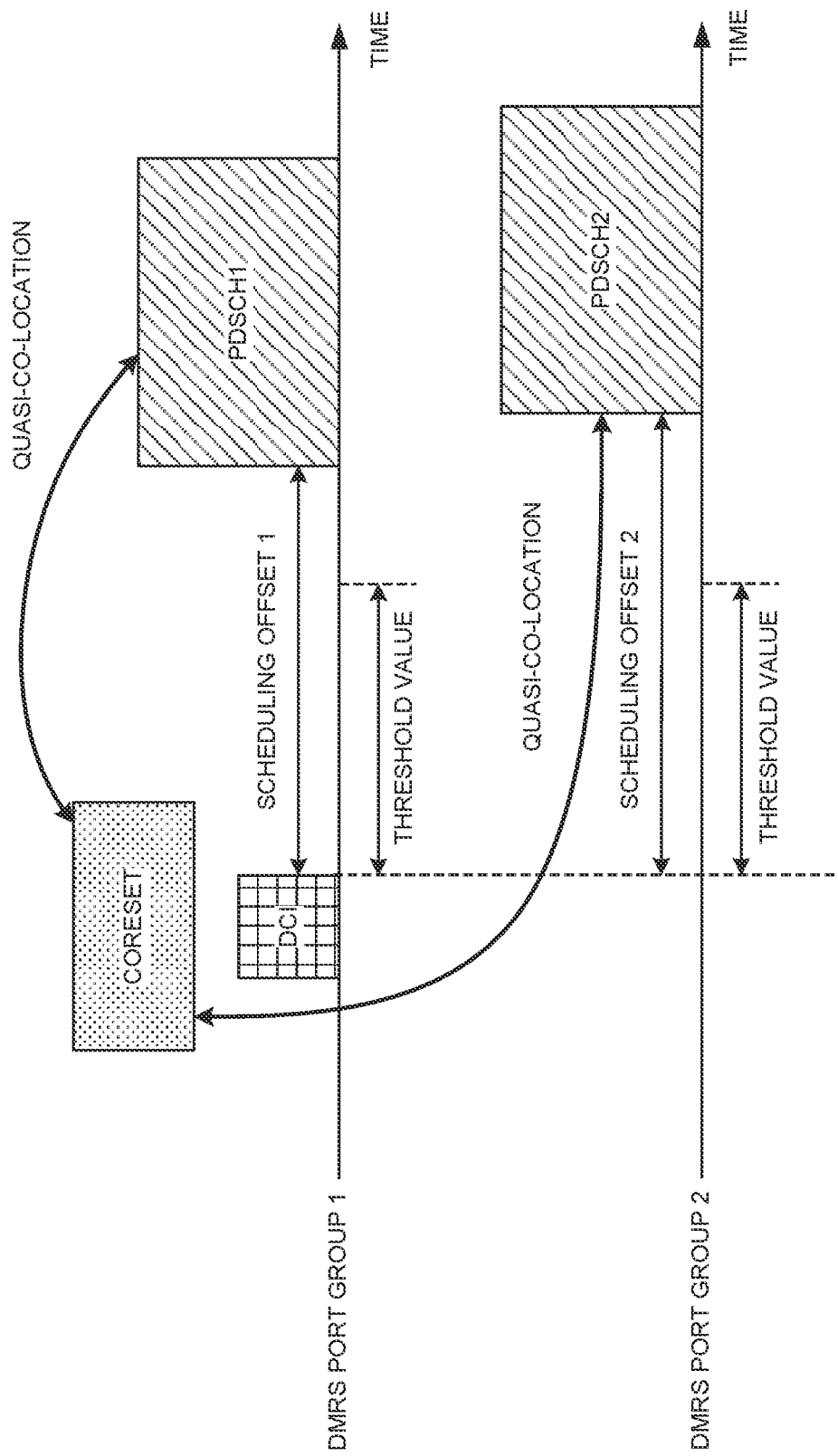
FIG. 4 is a diagram to show an example of a first determination of a TCI state according to a second aspect.

FIG. 4 is a diagram to show an example of the first determination of the TCI state according to the second aspect. FIG. 4 differs from FIG. 3 in that the UE (e.g., a UE in the connected mode) does not receive TCI presence information (e.g., an RRC IE "TCI-PresentInDCI") indicating presence of a TCI field in DCI. In the following, differences from FIG. 3 will be mainly described.

In a case shown in FIG. 4, the UE may determine a TCI state of PDSCHs 1 and 2 with each of DMRS port groups 1 and 2 on the basis of a CORESET that is used for reception of DCI via a PDCCH with the DMRS port group 1. Specifically, the UE may assume that the TCI state of the PDSCHs 1 and 2 is the same as a single TCI state that is applied for the CORESET.

Note that the CORESET used for reception of the DCI may be a CORESET that is associated with a certain search space set for monitoring the DCI.

In the first determination of the TCI state, the TCI state of the plurality of PDSCHs is determined on the basis of the CORESET for DCI for scheduling a plurality of PDSCHs with different DMRS port groups. Therefore, it is possible to appropriately determine the TCI state of the plurality of PDSCHs even when the TCI field is not present in the DCI.

<Second Determination of TCI State>

In the second determination of the TCI state, when a plurality of PDSCHs with different DMRS port groups are scheduled by a single piece of DCI, the UE may determine a TCI state of each of the plurality of PDSCHs on the basis of a specific code point of a TCI field.

Each code point (each value) of the TCI field may be associated with one or a plurality of TCI states (indicate the TCI states). The TCI states associated with each code point may be configured on the basis of an RRC parameter (e.g., "tci-StatesToAddModList" in an RRC IE). Alternatively, the TCI states associated with each code point may be a TCI state activated by a MAC CE, out of a plurality of TCI states configured by the RRC parameter.

The specific code point may be, for example, the lowest code point (e.g., "000") of the TCI field, a code point that indicates the first TCI state activated by the MAC CE, or the lowest code point out of one or more code points that are associated with a plurality of TCI states. One or a plurality of TCI states that are associated with the specific code point are referred to as a default TCI state and so on.

In the second determination of the TCI state, the UE may determine the TCI state of each of the plurality of PDSCHs on the basis of the default TCI state.

Figure 5:
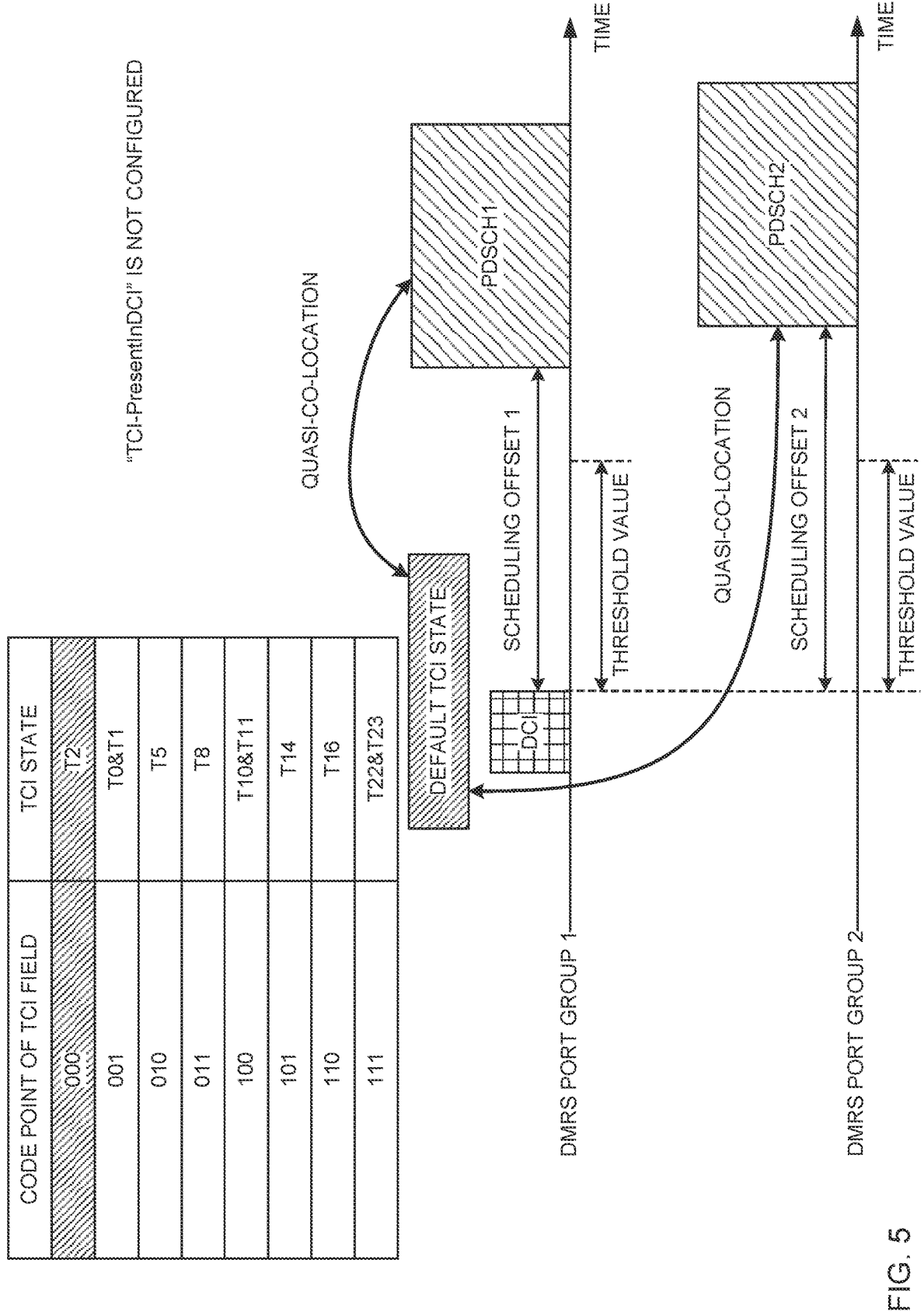
FIG. 5 is a diagram to show an example of a second determination of a TCI state according to the second aspect.

FIG. 5 is a diagram to show an example of the second determination of the TCI state according to the second aspect. FIG. 5 differs from FIG. 4 in that, on the basis of the default TCI state in place of a TCI state of a CORESET for DCI for scheduling a plurality of PDSCHs with different DMRS port groups a TCI state of the plurality of PDSCHs. In the following, descriptions of similarities to FIG. 3 or FIG. 4 will be omitted, and differences from FIG. 3 or FIG. 4 will be mainly described.

As shown in FIG. 5, the default TCI state may be a TCI state that is associated with the specific code point of the TCI field. For example, in FIG. 5, the default TCI state may be a TCI state "T2" that is associated with the lowest code point "000" of the TCI field.

The default TCI state that is associated with the specific code point (e.g., the lowest code point) may be a single TCI state, or may be a plurality of TCI states. For example, as shown in FIG. 5, when the default TCI state is a single TCI state, the UE may assume that a TCI state of a plurality of PDSCHs (here, PDSCHs 1 and 2 with each of DMRS port groups 1 and 2) scheduled by a single piece of DCI is the same as the single TCI state ("T2").

Note that as shown in FIG. 5, when the default TCI state is the single TCI state, the UE may assume that a PDSCH with a single DMRS port group is scheduled by the single piece of the DCI as long as the above-described TCI presence information is not configured for the UE.

On the other hand, although not shown in the drawings, when the default TCI state is a plurality of TCI states (e.g., the default TCI state corresponding to the code point "000" is TCI states "T0" and "T1"), the UE may assume that the plurality of TCI states corresponds to TCI states of PDSCHs with different DMRS port groups.

For example, when the default TCI state is the plurality of TCI states "T0" and "T1," the first TCI state "T0" may correspond to a TCI state of the PDSCH with the DMRS port group 1 and the second TCI state "T1" may correspond to a TCI state of the PDSCH with the DMRS port group 2, or these TCI states may be reversed.

As described above, although an association between a plurality of TCI states that are the default TCI states and a plurality of DMRS port groups may be based on a sequence of the association with the specific code point of the TCI field, the present disclosure is not limited to this. For example, the association between the plurality of TCI states and the plurality of DMRS port groups may be based on IDs of the plurality of TCI states. For example, the lowest ID (or the highest ID) of the TCI states may be associated with the DMRS port group 1, and the highest ID (or the lowest ID) of the TCI states may be associated with the DMRS port group 2.

Figure 6:
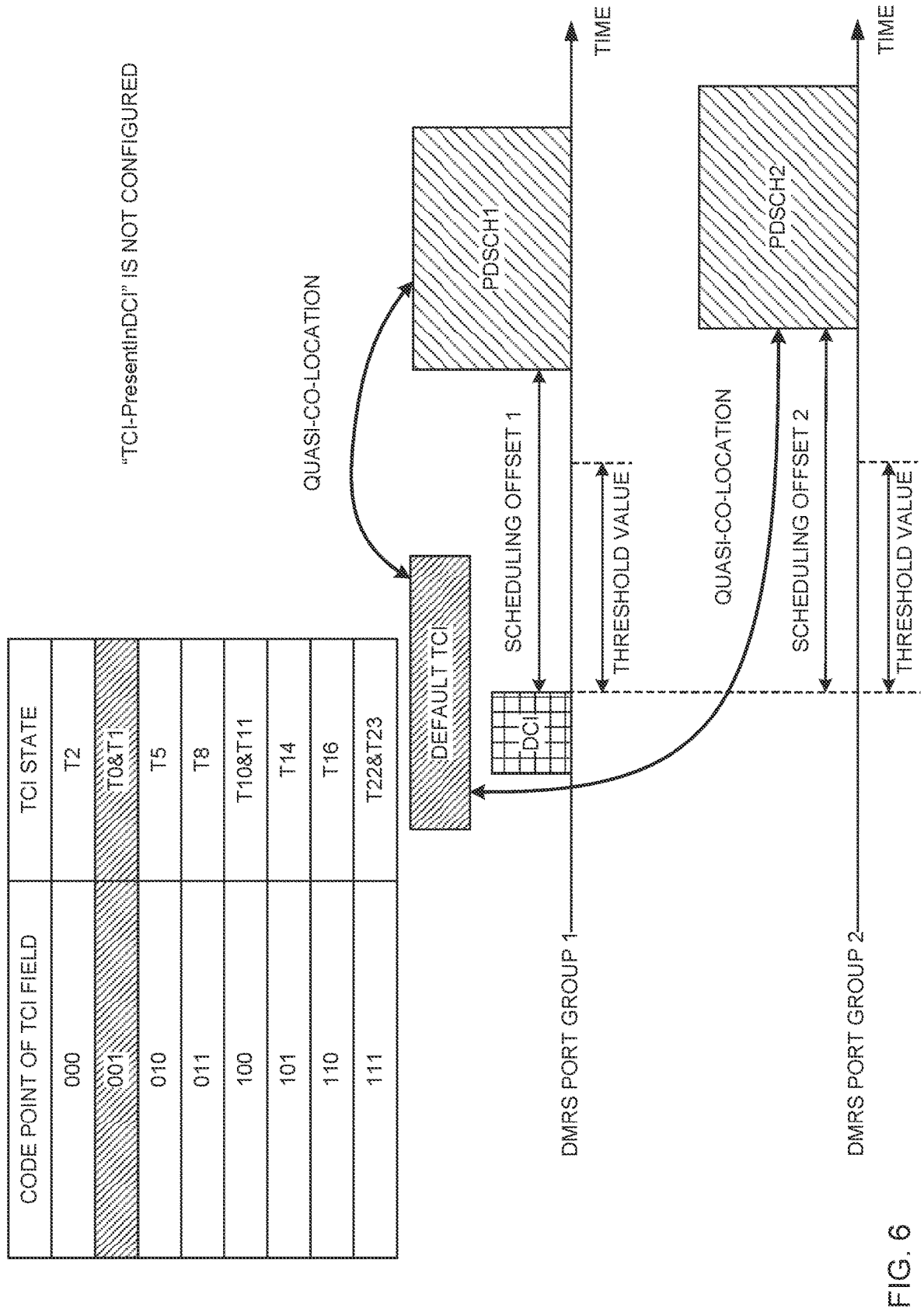
FIG. 6 is a diagram to show another example of the second determination of the TCI state according to the second aspect.

FIG. 6 is a diagram to show another example of the second determination of the TCI state according to the second aspect. FIG. 6 differs from FIG. 5 in that the specific code point is the lowest code point out of code points (e.g., "001," "100," and "111") associated with a plurality of TCI states and the default TCI state is the plurality of TCI states "T0" and "T1." In the following, descriptions of similarities to FIG. 5 will be omitted, and differences from FIG. 5 will be mainly described.

As shown in FIG. 6, when the default TCI state is a plurality of TCI states (here, the default TCI state is the TCI states "T0" and "T1" of the code point "001"), the UE may assume that the plurality of TCI states correspond to TCI states of PDSCHs with different DMRS port groups. The association between a plurality of TCI states that are the default TCI state and a plurality of DMRS port groups is as described above.

In the second determination of the TCI state, the TCI state of the plurality of PDSCHs with different DMRS port groups scheduled by a single piece of DCI is determined on the basis of the default TCI state that is associated with the specific code point of the TCI field. Therefore, it is possible to appropriately determine the TCI state of the plurality of PDSCHs even when the TCI field is not present in the DCI.

<Third Determination of TCI State>

In the third determination of the TCI state, when a plurality of PDSCHs with different DMRS port groups are scheduled by a single piece of DCI, the UE may determine a TCI state of each of the plurality of PDSCHs on the basis of a specific TCI state that is configured by a higher layer parameter (e.g., an RRC parameter) for each DMRS port group.

The UE may receive information (e.g., a list of TCI states or TCI state IDs) that indicates one or a plurality of TCI states for each DMRS port group. The UE may receive the information using the higher layer parameter.

The above-described specific TCI state may be, for example, a TCI state with the lowest or highest ID out of one or a plurality of TCI states for each DMRS port group. The specific TCI state is referred to as a default TCI state and so on.

In the third determination of the TCI state, the UE may determine each TCI state of a plurality of PDSCHs with different DMRS port groups on the basis of the default TCI state for each DMRS port group. Specifically, the UE may assume that each TCI state of the plurality of PDSCHs is the same as the default TCI state of a DMRS port group that corresponds to each of the plurality of PDSCHs.

Figure 7:
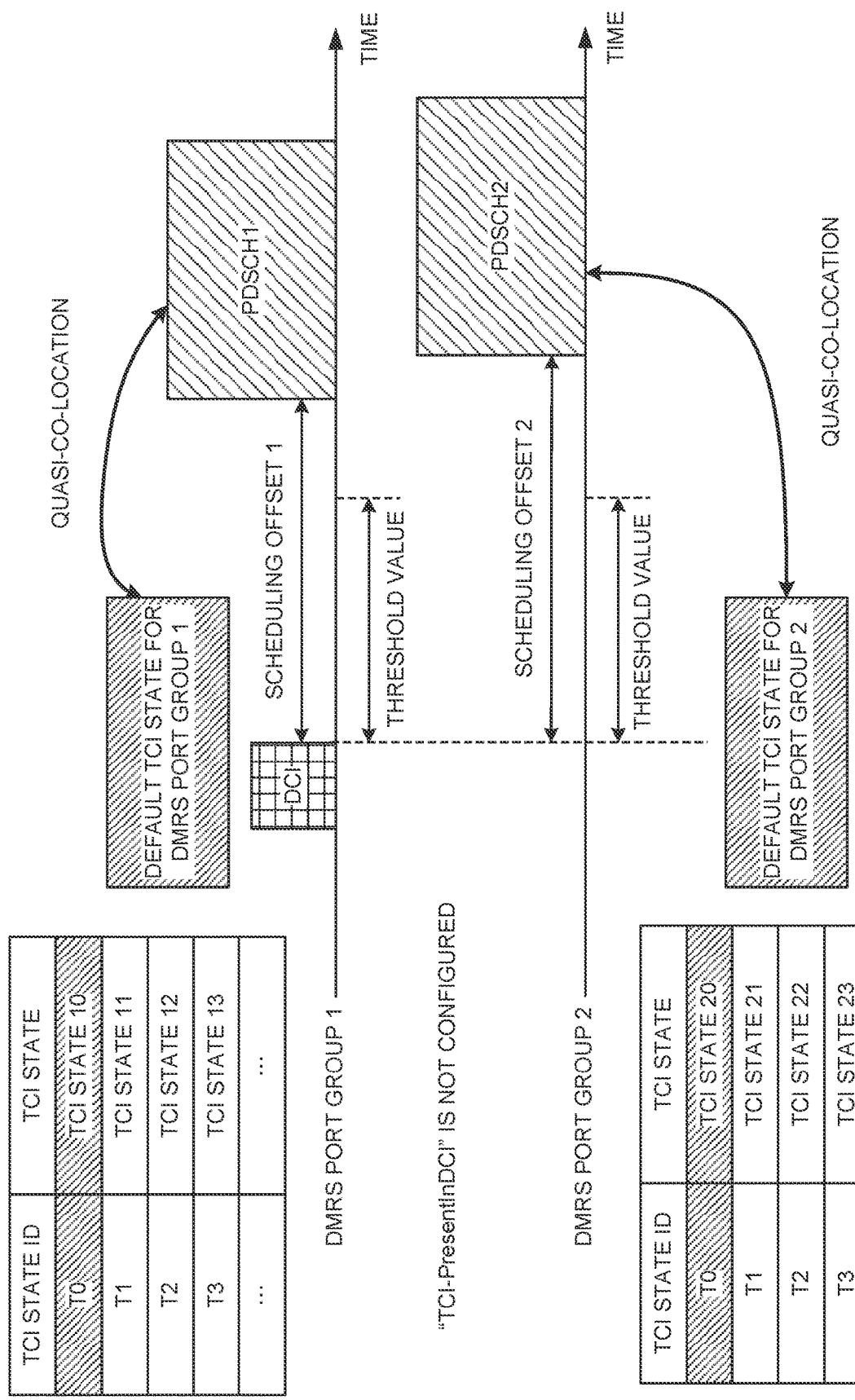
FIG. 7 is a diagram to show an example of a third determination of a TCI state according to the second aspect.

FIG. 7 is a diagram to show an example of the third determination of the TCI state according to the second aspect. FIG. 7 differs from FIGS. 3 to 6 in determining each TCI state of the plurality of PDSCHs on the basis of the default TCI state that is configured by the higher layer parameter for each DMRS port group. In the following, differences from FIGS. 3 to 6 will be mainly described.

As shown in FIG. 7, the default TCI state of each DMRS port group may be a TCI state having the lowest ID out of one or more TCI states that are configured for each DMRS port group. For example, in FIG. 7, the default TCI state of the DMRS port group 1 is a TCI state 10, and the default TCI state of the DMRS port group 2 is a TCI state 20.

As shown in FIG. 7, the UE may assume that each TCI state of a plurality of PDSCHs (here, the PDSCHs 1 and 2 with each of the DMRS port groups 1 and 2) scheduled by a single piece of DCI is the same as the default TCI state of a DMRS port group that corresponds to each of the plurality of PDSCHs.

In the third determination of the TCI state, the TCI state of the plurality of PDSCHs with different DMRS port groups scheduled by a single piece of DCI is determined on the basis of the default TCI state that is configured by the higher layer parameter for each DMRS port group. Therefore, it is possible to appropriately determine the TCI state of the plurality of PDSCHs even when the TCI field is not present in the DCI.

As described above, in the second aspect, when a plurality of PDSCHs with different DMRS port groups is scheduled by a single piece of DCI, the UE can appropriately determine a TCI state of each of the plurality of PDSCHs by assuming that the TCI state is based on a same QCL assumption even when the TCI field is absent in the DCI.

(Third Aspect)

In the third aspect, when a plurality of PDSCHs with different DMRS port groups is scheduled by a single piece of DCI, a UE may assume that a TCI state of each of the plurality of PDSCHs is based on an independent (separate) QCL assumption.

Specifically, when TCI presence information (e.g., an RRC IE "TCI-PresentInDCI") indicating presence of a TCI field in the DCI is not configured, the UE may individually (independently) control the TCI state of each of the above-described plurality of PDSCHs. The third aspect differs from the second aspect in that, for example, the UE controls a determination of the TCI state of each of the above-described plurality of PDSCHs on the basis of whether each PDSCH is a PDSCH with a same DMRS port group as a PDCCH to communicate the above-described DCI. In the third aspect, differences from the second aspect will be mainly described.

In the third aspect, the UE may determine a TCI state of a specific PDSCH (e.g., a PDSCH with a same DMRS port group as the above-described PDCCH) out of the plurality of PDSCHs on the basis of a CORESET used for transmission of the DCI. Specifically, the UE may assume that the TCI state of the specific PDSCH is the same as a TCI state applied for the CORESET.

The TCI state applied for the CORESET may be specified by at least one of an RRC parameter (e.g., an RRC IE "tci-State") and a MAC CE. Note that when one or more TCI states are configured for the CORESET by a higher layer parameter, the TCI state applied for the above-described CORESET may be a single TCI state that is activated by the MAC CE.

On the other hand, the UE may determine a TCI state of another PDSCH (e.g., a PDSCH with a different DMRS port group from the above-described PDCCH) out of the plurality of PDSCHs on the basis of at least one of a specific code point (a first determination of a TCI state of another PDSCH) of the TCI field and a specific TCI state (a second determination of a TCI state of another PDSCH) that is associated with a DMRS port group of such another PDSCH.

<First Determination of TCI State of Another PDSCH>

The UE may determine a TCI state of a PDSCH (e.g., a PDSCH with a different DMRS port group from the PDCCH) other than the above-described specific PDSCH out of a plurality of PDSCHs with different DMRS port groups on the basis of a default TCI state that is associated with a specific code point of the TCI field.

Figure 8:
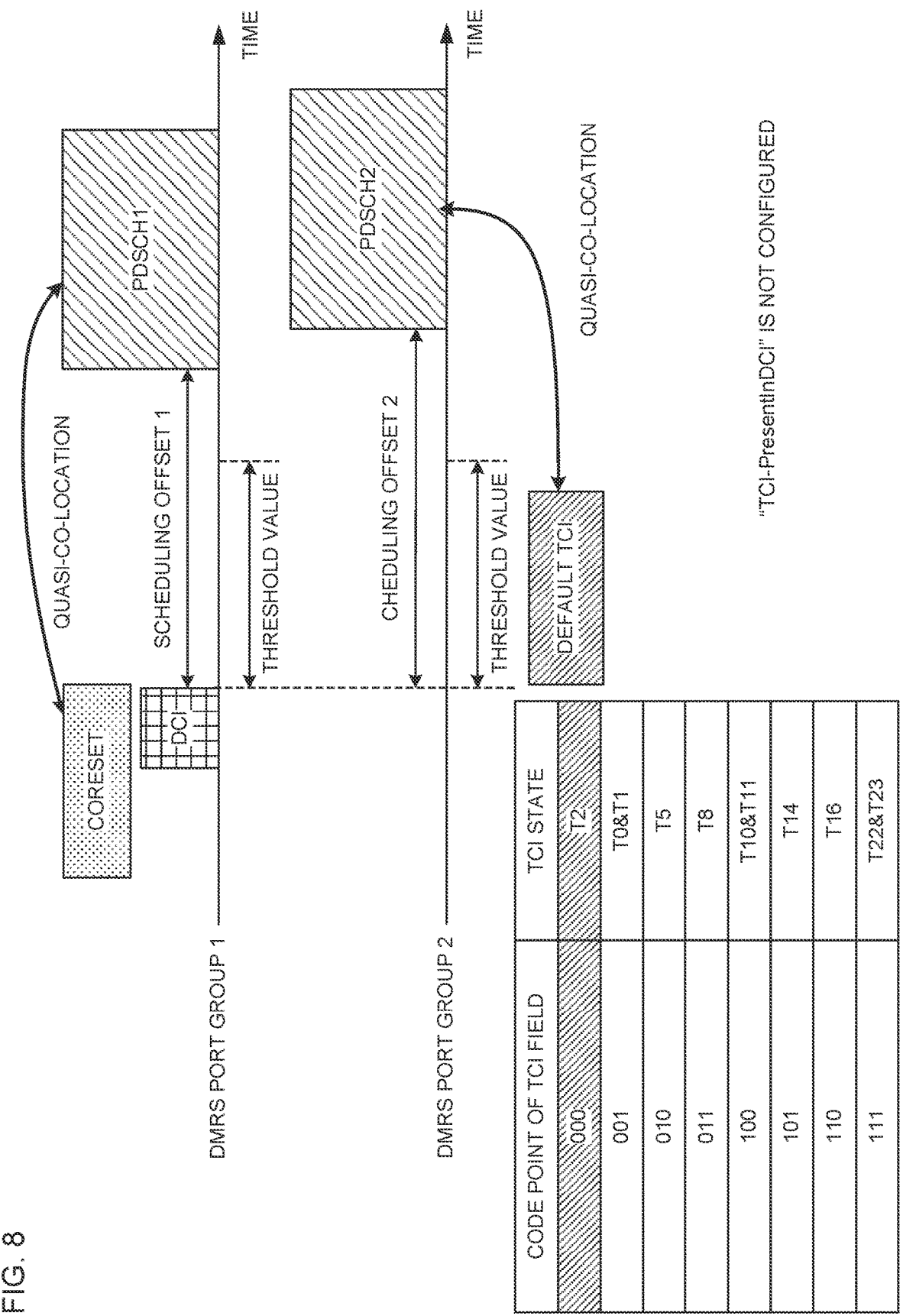
FIG. 8 is a diagram to show an example of a first determination of a TCI state of another PDSCH according to a third aspect.

FIG. 8 is a diagram to show an example of the first determination of the TCI state of another PDSCH according to the third aspect. FIG. 8 differs from FIG. 5 in that a TCI state of a PDSCH 1 with a same DMRS port group 1 as the PDCCH to communicate DCI is determined on the basis of a CORESET for the DCI. In the following, differences from FIG. 5 will be mainly described.

As shown in FIG. 8, the default TCI state may be a TCI state that is associated with the specific code point of the TCI field. The specific code point is as described in the second determination of the TCI state according to the second aspect. For example, in FIG. 8, the default TCI state may be a TCI state "T2" that is associated with the lowest code point "000" of the TCI field.

Note that the default TCI state that is associated with the specific code point (e.g., the lowest code point) may be a single TCI state, or may be a plurality of TCI states. As shown in FIG. 8, when the default TCI state is a single TCI state, the UE may assume that a TCI state of a PDSCH 2 with a DMRS port group 2 that is different from that of the PDCCH to communicate DCI is the same as the single TCI state ("T2").

On the other hand, although not shown in the drawings, when the default TCI state is a plurality of TCI states (e.g., the default TCI state corresponding to the code point "000" is TCI states "T0" and "T1"), the UE may assume that one of the plurality of TCI states that is determined in accordance with a certain rule is the same as the TCI state of the above-described PDSCH 2.

The TCI state determined in accordance with the certain rule may be a TCI state that is specified by a higher layer parameter out of the plurality of TCI states, may be a TCI state in a certain sequence (e.g., the first TCI state), or may be a TCI state with a certain (e.g., the lowest or highest) ID.

Figure 9:
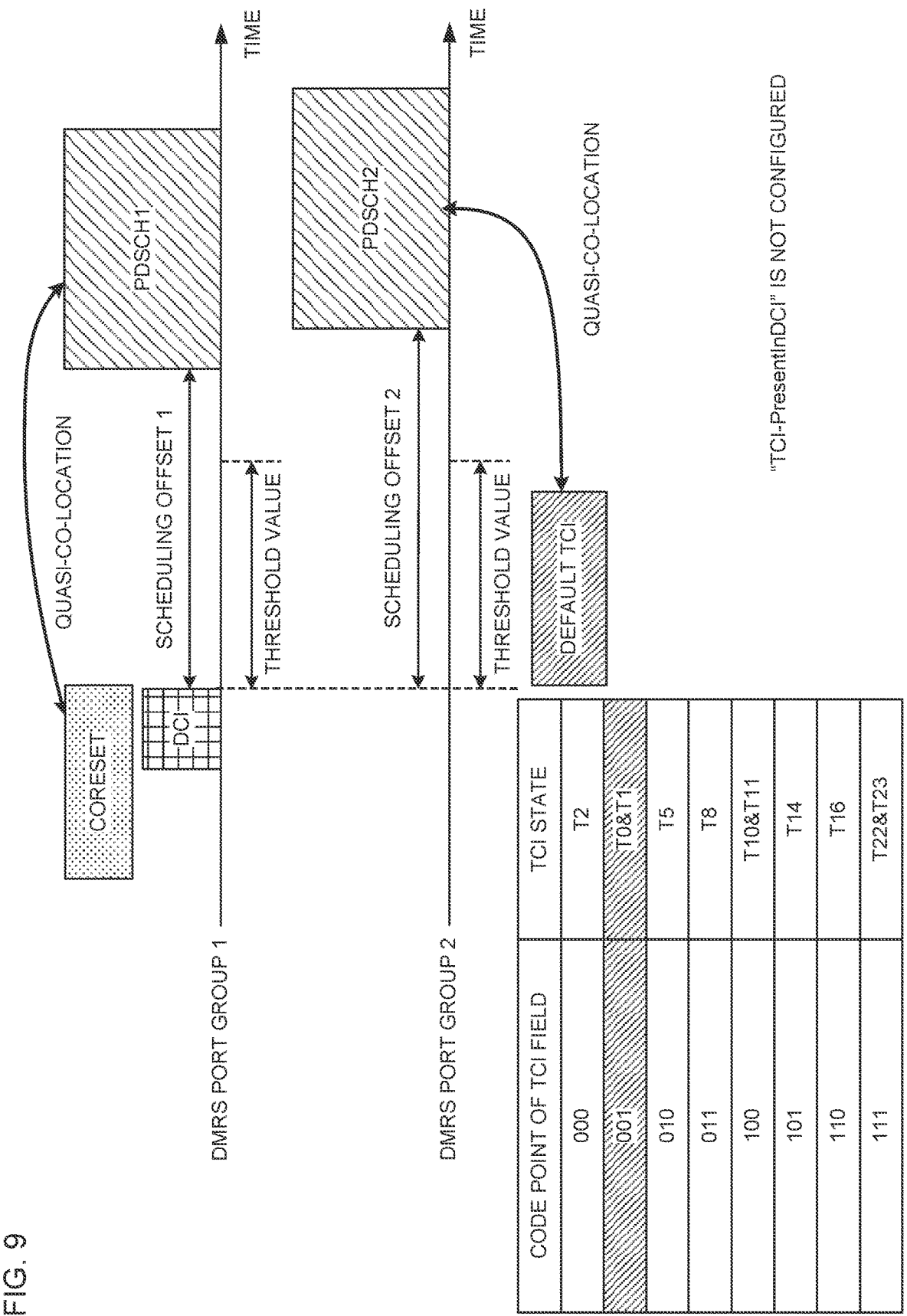
FIG. 9 is a diagram to show another example of the first determination of the TCI state of another PDSCH according to the third aspect.

FIG. 9 is a diagram to show another example of the first determination of the TCI state of another PDSCH according to the third aspect. FIG. 9 differs from FIG. 8 in that the specific code point is the lowest code point out of code points (e.g., "001," "100," and "111") associated with a plurality of TCI states and the default TCI state is the plurality of TCI states "T0" and "T1." In the following, descriptions of similarities to FIG. 8 will be omitted, and differences from FIG. 8 will be mainly described.

As shown in FIG. 9, when the default TCI state is a plurality of TCI states (here, the default TCI state is the TCI states "T0" and "T1" of the code point "001"), the UE may assume that one of the plurality of TCI states that is determined in accordance with the certain rule is the same as the TCI state of the above-described PDSCH 2.

The TCI state determined in accordance with the certain rule may be a TCI state that is specified by a higher layer parameter out of the plurality of TCI states, may be a TCI state in a certain sequence (e.g., the first TCI state), or may be a TCI state with a certain (e.g., the lowest or highest) ID.

In the first determination of the TCI state of another PDSCH, the TCI state of the PDSCH with a different DMRS port group from a single piece of DCI for scheduling the above-described plurality of PDSCHs is determined on the basis of the default TCI state that is associated with the specific code point of the TCI field. Therefore, it is possible to appropriately determine the TCI state of such another PDSCH.

<Second Determination of TCI State of Another PDSCH>

The UE may determine a TCI state of a PDSCH (e.g., a PDSCH with a different DMRS port group from the PDCCH) other than the above-described specific PDSCH out of a plurality of PDSCHs with different DMRS port groups on the basis of a specific TCI state that is configured for a DMRS port group of the PDSCH.

The UE may receive at least information (e.g., a list of TCI states or TCI state IDs) indicating one or a plurality of TCI states that is configured with respect to a DMRS port group of such another PDSCH. The UE may receive the information using the higher layer parameter. The UE may receive the above-described information for each DMRS port group of the plurality of PDSCHs.

The above-described specific TCI state may be, for example, a TCI state with the lowest or highest ID out of one or a plurality of TCI states for each DMRS port group. The specific TCI state is referred to as a default TCI state and so on.

The UE may determine, on the basis of the default TCI state of a different DMRS port group from a PDCCH to communicate DCI for scheduling the plurality of PDSCHs, a TCI state of a PDSCH with the DMRS port group. Specifically, the UE may assume that the TCI state of the PDSCH is the same as the default TCI state of the DMRS port group.

Figure 10:
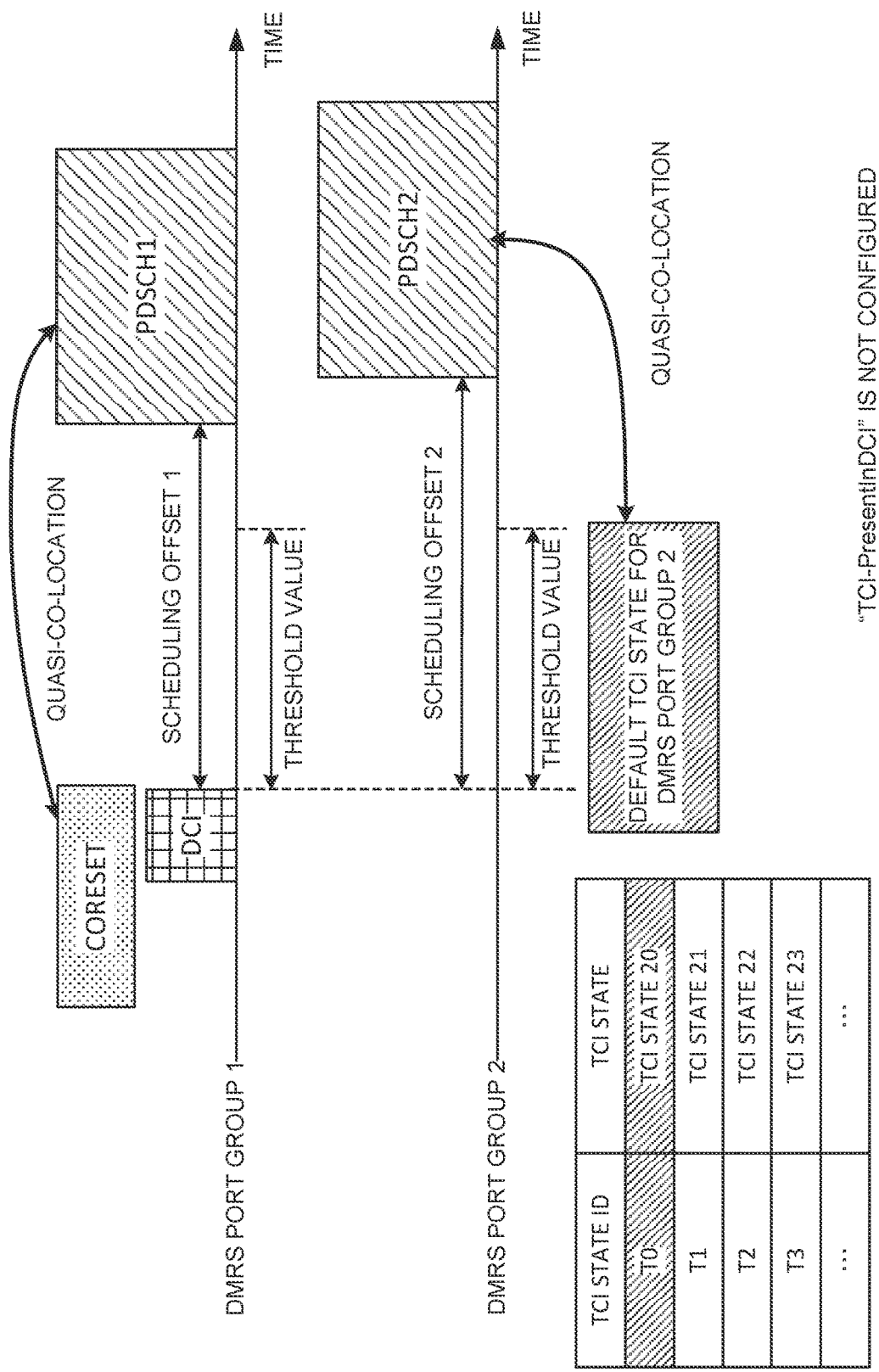
FIG. 10 is a diagram to show an example of a second determination of a TCI state of another PDSCH according to the third aspect.

FIG. 10 is a diagram to show an example of the second determination of the TCI state of another PDSCH according to the third aspect. FIG. 10 differs from FIGS. 8 to 9 in determining the TCI state of the PDSCH 2 with the DMRS port group 2 on the basis of the default TCI state that is configured for the DMRS port group 2 by the higher layer parameter. In the following, descriptions of similarities to FIG. 8 or FIG. 9 will be omitted, and differences from FIG. 3 or FIG. 4 will be mainly described.

As shown in FIG. 10, the default TCI state of the DMRS port group 2 may be a TCI state having the lowest ID out of one or more TCI states that are configured for the DMRS port group 2. For example, in FIG. 10, the default TCI state of the DMRS port group 2 is a TCI state 20.

As shown in FIG. 10, the UE may assume that, in a plurality of PDSCHs (here, PDSCHs 1 and 2 with each of DMRS port groups 1 and 2) that is scheduled by a single piece of DCI, the TCI state of the PDSCH 2 with a different DMRS port group 2 different from the DCI is the same as the default TCI state that is configured for the DMRS port group 2.

In the second determination of the TCI state of another PDSCH, the TCI state of such another PDSCH is determined on the basis of the default TCI state of a different DMRS port group from the single piece of DCI for scheduling the plurality of PDSCHs. Therefore, it is possible to appropriately determine the TCI state of such another PDSCH.

Note that in FIGS. 8 to 10, the UE may assume that, in a plurality of PDSCHs (here, the PDSCHs 1 and 2 with each of the DMRS port groups 1 and 2) that is scheduled by a single piece of DCI, the TCI state of the PDSCH 1 with a same DMRS port group 1 as the DCI is the same as the TCI state of the CORESET used for transmission of the DCI.

As described above, in the third aspect, when a plurality of PDSCHs with different DMRS port groups is scheduled by a single piece of DCI, it is possible to appropriately determine a TCI state of each of the plurality of PDSCHs using a different method by assuming that the plurality of PDSCHs is based on an independent QCL assumption.

(Other Aspects)

The first to third aspects above may be employed regardless of a relationship between a time offset (scheduling offset) between reception of a single piece of DCI for scheduling a plurality of PDSCHs with different DMRS port groups and reception of at least one of the plurality of PDSCHs, and a certain threshold value (e.g., Threshold-Sched-Offset), or may be employed on the basis of the relationship.

Specifically, the above-described first to third aspects may be employed in a case where the scheduling offset is equal to or greater than a certain threshold value (e.g., Threshold-Sched-Offset) or is greater than the certain threshold value. On the other hand, when the scheduling offset is less than the certain threshold value or is equal to or less than the certain threshold value, a TCI state of the plurality of PDSCHs may be determined using a different method from the above-described first to third aspects.

For example, when the scheduling offset is less than the certain threshold value or is equal to or less than the certain threshold value, a UE may control, on the basis of whether a plurality of PDSCHs corresponds to (is the same as) a DMRS port group of the PDCCH to communicate a single piece of DCI, a determination of a TCI state of the plurality of PDSCHs scheduled by the DCI.

For example, the UE may assume that a TCI state of a PDSCH with a same DMRS port group as the above-described PDCCH is the same as a TCI state of a specific CORESET (e.g., a CORESET with the lowest ID) out of one or more CORESETs that are configured in a certain slot (e.g., the most recent (latest) slot). The one or more CORESETs may configured on an active BWP in a serving cell in which the PDSCH is communicated. On the other hand, the UE may assume that a TCI state of a PDSCH with a different DMRS port group from the above-described PDCCH is the same as a TCI state for the PDCCH.

Figure 11:
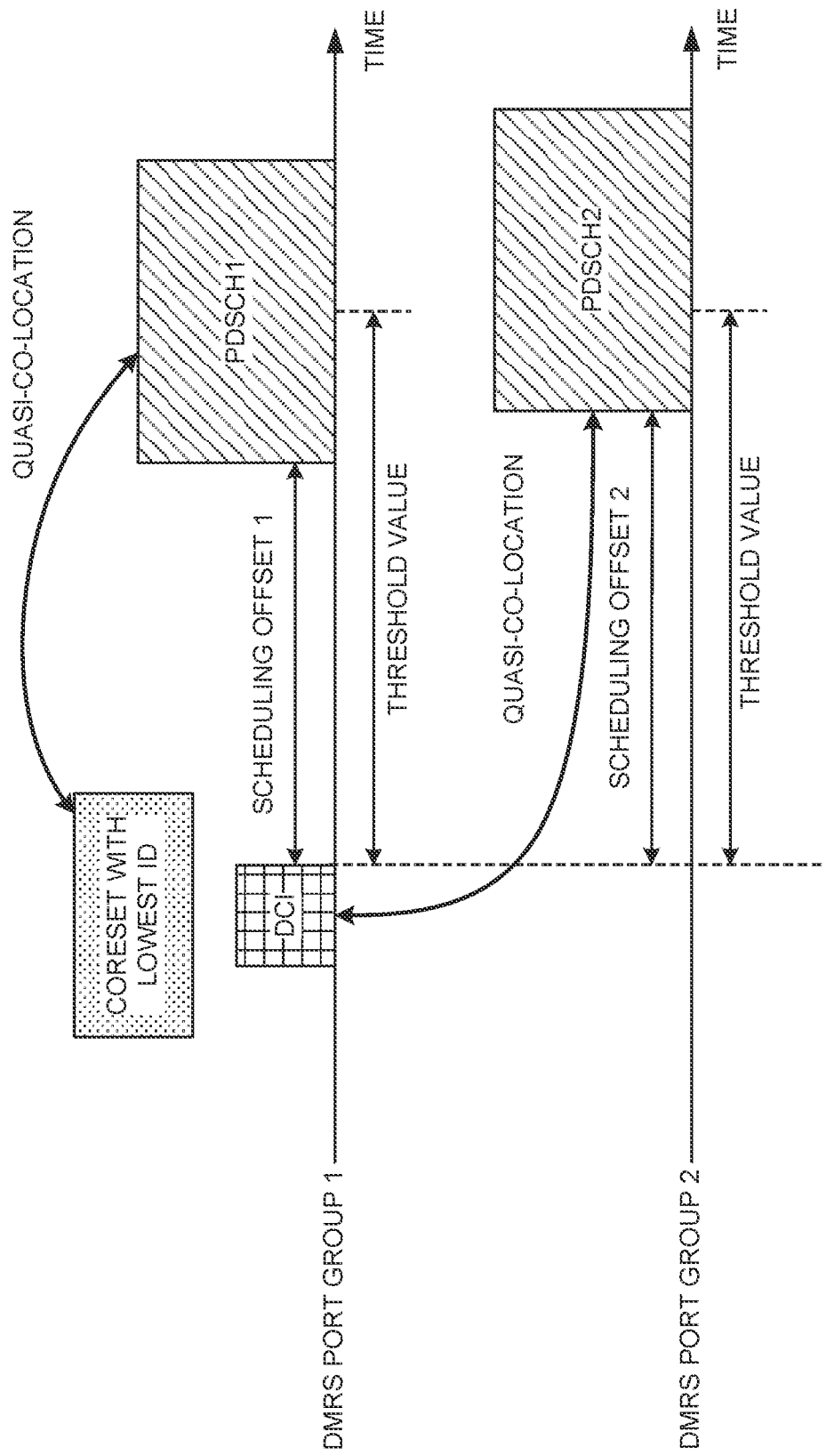
FIG. 11 is a diagram to show an example of a determination of a TCI state according to another aspect.

FIG. 11 is a diagram to show an example of the determination of the TCI state according to another aspect. In FIG. 11, assume a case where scheduling offsets 1 and 2 between reception of DCI for scheduling PDSCHs 1 and 2 with different DMRS port groups and reception of each of the PDSCHs 1 and 2 are shorter than a certain threshold value. Note that when the scheduling offsets 1 and 2 are equal to or greater than the certain threshold value or are greater than the certain threshold value, any one of the above-described first and third aspects may be employed.

As shown in FIG. 11, the UE may assume that a TCI state of the PDSCH 1 with a same DMRS port group 1 as a PDCCH to communicate DCI is the same as a TCI state of a specific CORESET (e.g., a CORESET with the lowest ID) out of one or more CORESETs that are configured in a certain slot (e.g., the most recent slot).

One or more CORESETs may be configured for the UE for each serving cell (or each BWP), and the above-described specific CORESET may be one or more CORESETs that are configured in a serving cell used for reception of a PDSCH or on an active BWP.

On the other hand, the UE may assume that a TCI state of the PDSCH 2 with a different DMRS port group 2 from a PDCCH to communicate DCI is the same as a TCI state of the PDCCH.

Note that the scheduling offsets 1 and 2 described in each aspect description of the present disclosure may have a same time length, or may have different time lengths. Although the example in which the certain threshold value for the scheduling offset is common, not depending on a DMRS port group is described, the certain threshold value may be different for each DMRS port group.

A DMRS port group of a PDSCH in the present disclosure may be interpreted as a DMRS port group of another DL signal (e.g., a PBCH and so on).

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
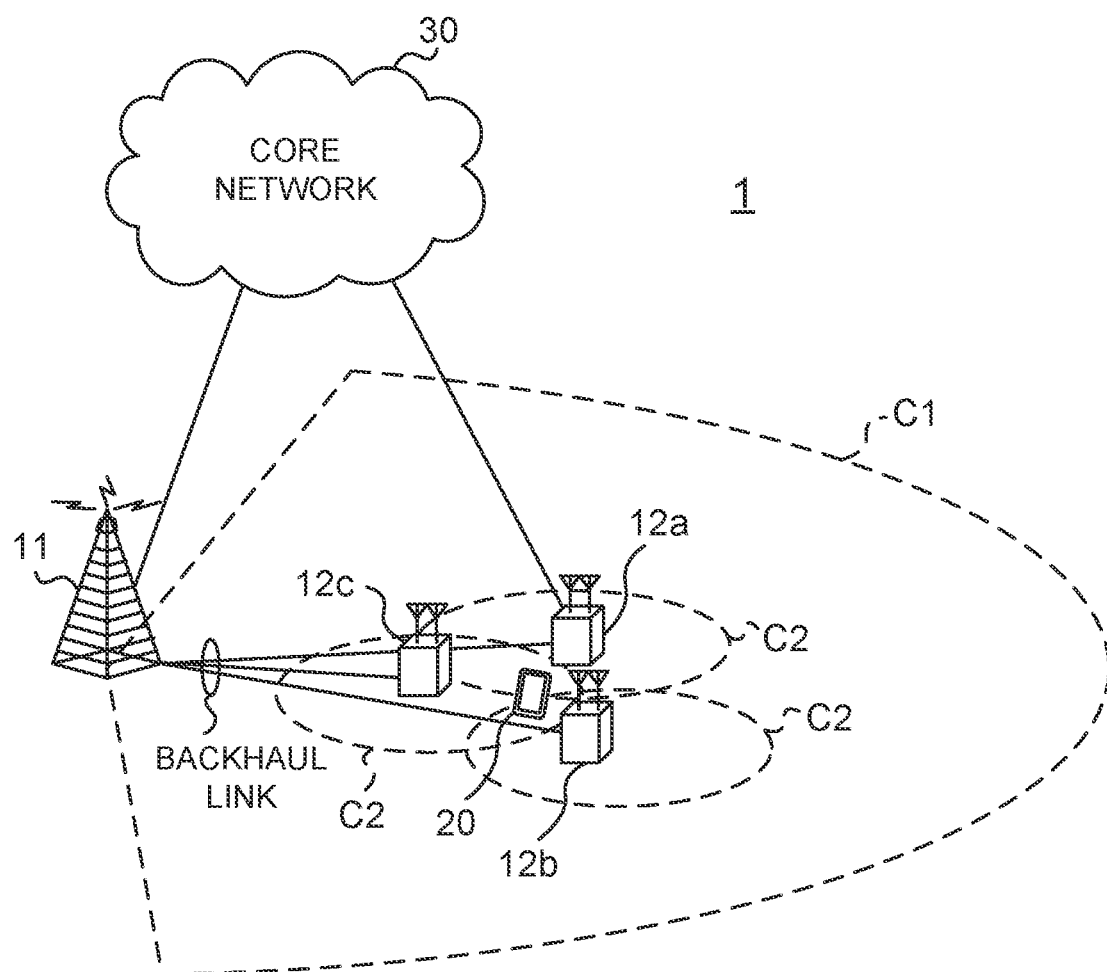
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
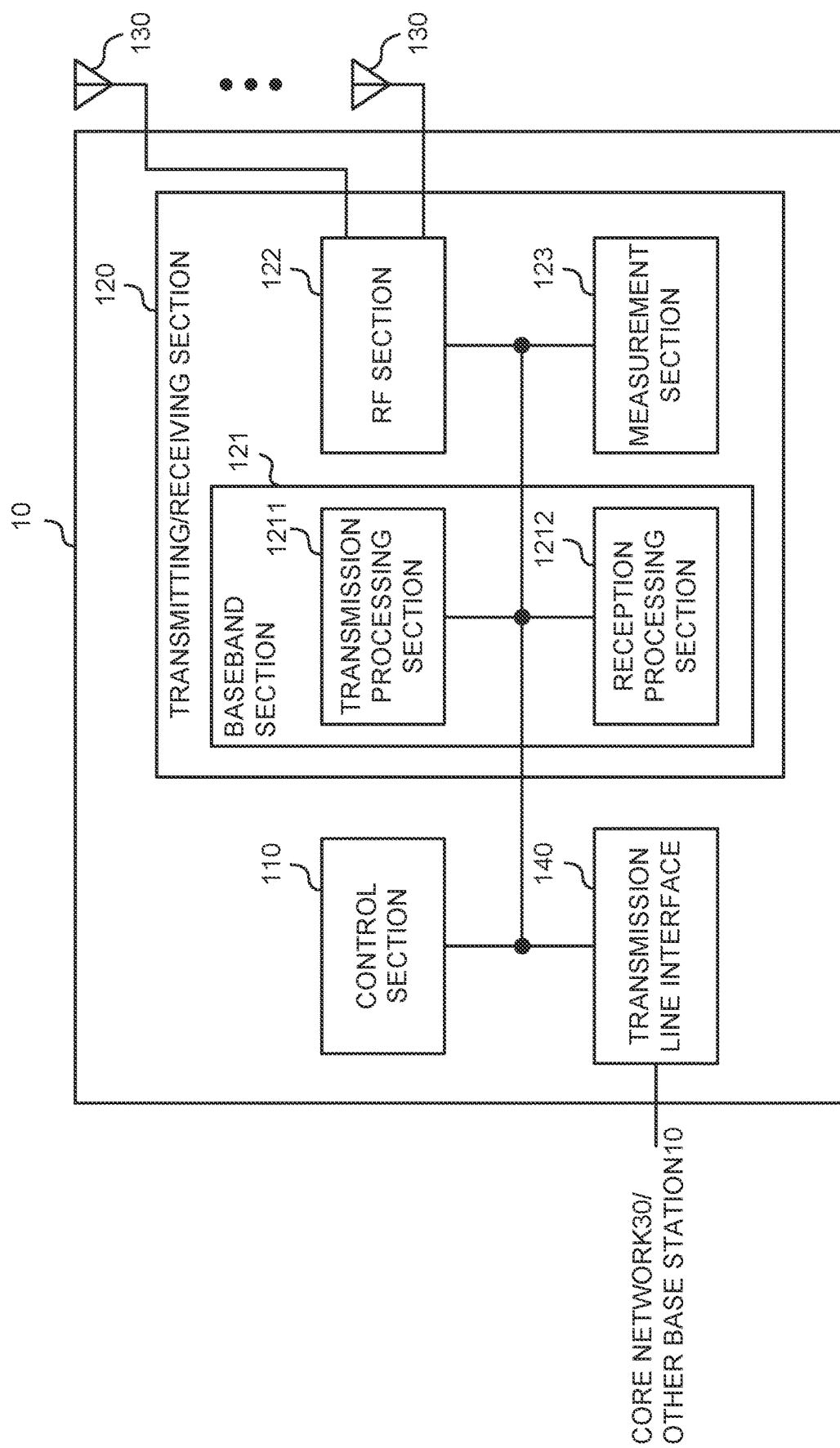
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit downlink control information (DCI) used for scheduling of a plurality of downlink shared channels with different antenna port groups for a demodulation reference signal. The transmitting/receiving section 120 may transmit the plurality of downlink shared channels.

The transmitting/receiving section 120 may transmit information indicating that a certain field that indicates a transmission configuration indication (TCI) state is present in DCI (the first aspect).

The transmitting/receiving section 120 may transmit a TCI state of a control resource set for the DCI. The transmitting/receiving section 120 may transmit information indicating one or a plurality of TCI states that are associated with each code point by at least one of a radio resource control (RRC) parameter and a Medium Access Control (MAC) control element. The transmitting/receiving section 120 may transmit information indicating a TCI state that is configured for each antenna port group for the demodulation reference signal.

(User Terminal)

Figure 14:
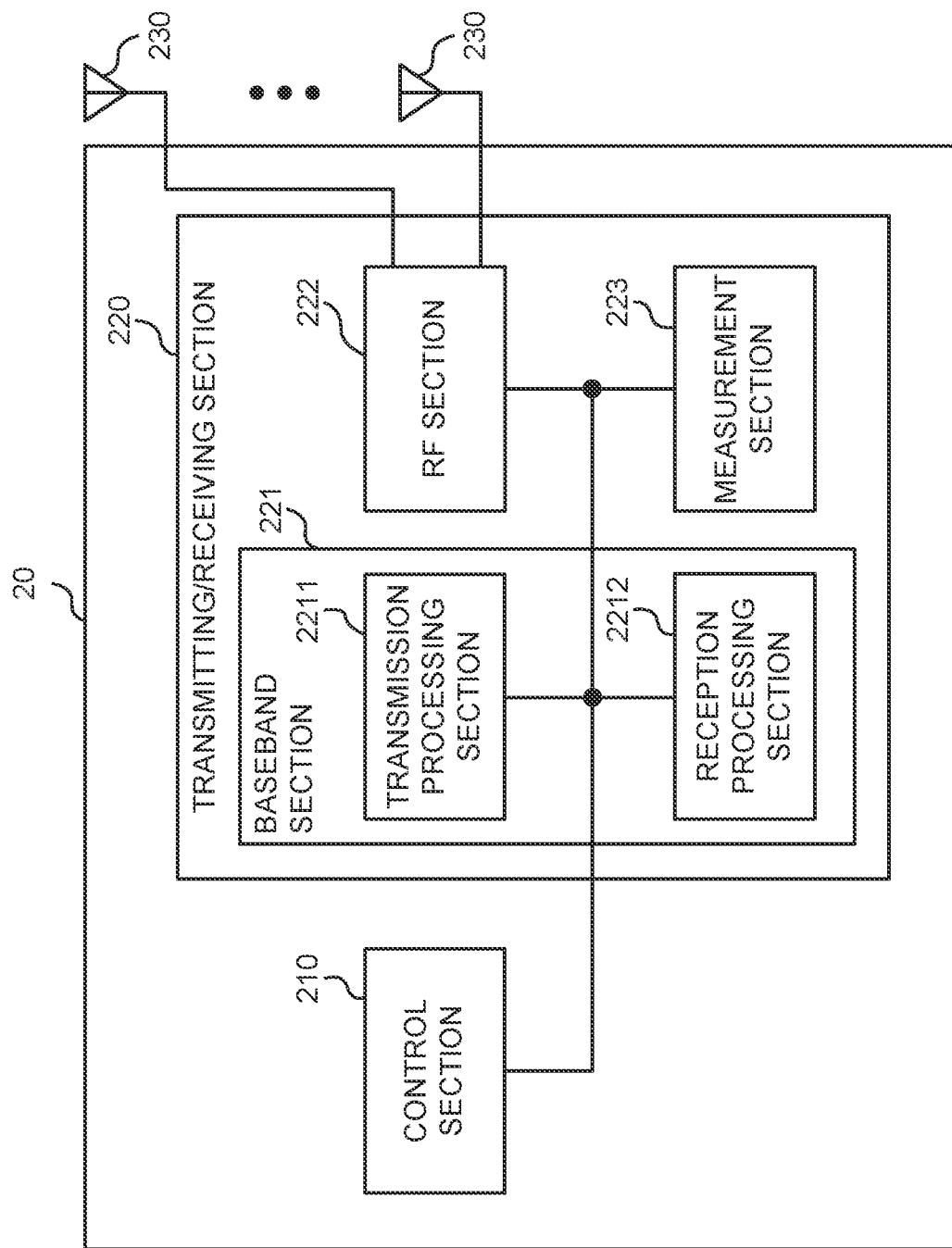
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/ receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply reception processing such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 may receive downlink control information (DCI) used for scheduling of a plurality of downlink shared channels with different antenna port groups for a demodulation reference signal.

When information indicating that a certain field that indicates a transmission configuration indication (TCI) state is present in the DCI is not configured, the control section 210 may commonly or individually control a transmission configuration indication (TCI) state of each of the plurality of downlink shared channels.

The control section 210 may determine the TCI state of each of the plurality of downlink shared channels on the basis of one or a plurality of TCI states that are associated with a specific code point by at least one of a TCI state of a control resource set for the DCI, a radio resource control (RRC) parameter, and a Medium Access Control (MAC) control element or a specific TCI state that is configured for each antenna port group for the demodulation reference signal (the second aspect).

The control section 210 may control a determination of the TCI state of each of the plurality of downlink shared channels on the basis of whether each of the plurality of downlink shared channels is a downlink shared channel with a same antenna port group as a downlink control channel to communicate the DCI (the third aspect).

The control section 210 may determine a TCI state of a downlink shared channel with a same antenna port group as the downlink control channel on the basis of a TCI state of a control resource set for the DCI. On the other hand, the control section 210 may determine a TCI state of a downlink shared channel with a different antenna port group from the downlink control channel on the basis of one or a plurality of TCI states that are associated with a specific code point by at least one of the radio resource control (RRC) parameter and Medium Access Control (MAC) control element or a specific TCI state that is configured for a different antenna port group from the downlink control channel.

The control section 210 may assume that information indicating presence of a certain field indicating a certain transmission configuration indication (TCI) state in the DCI is configured, and may control a transmission configuration indication (TCI) state of each of the plurality of downlink shared channels on the basis of a value of the certain field in the DCI (the first aspect).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
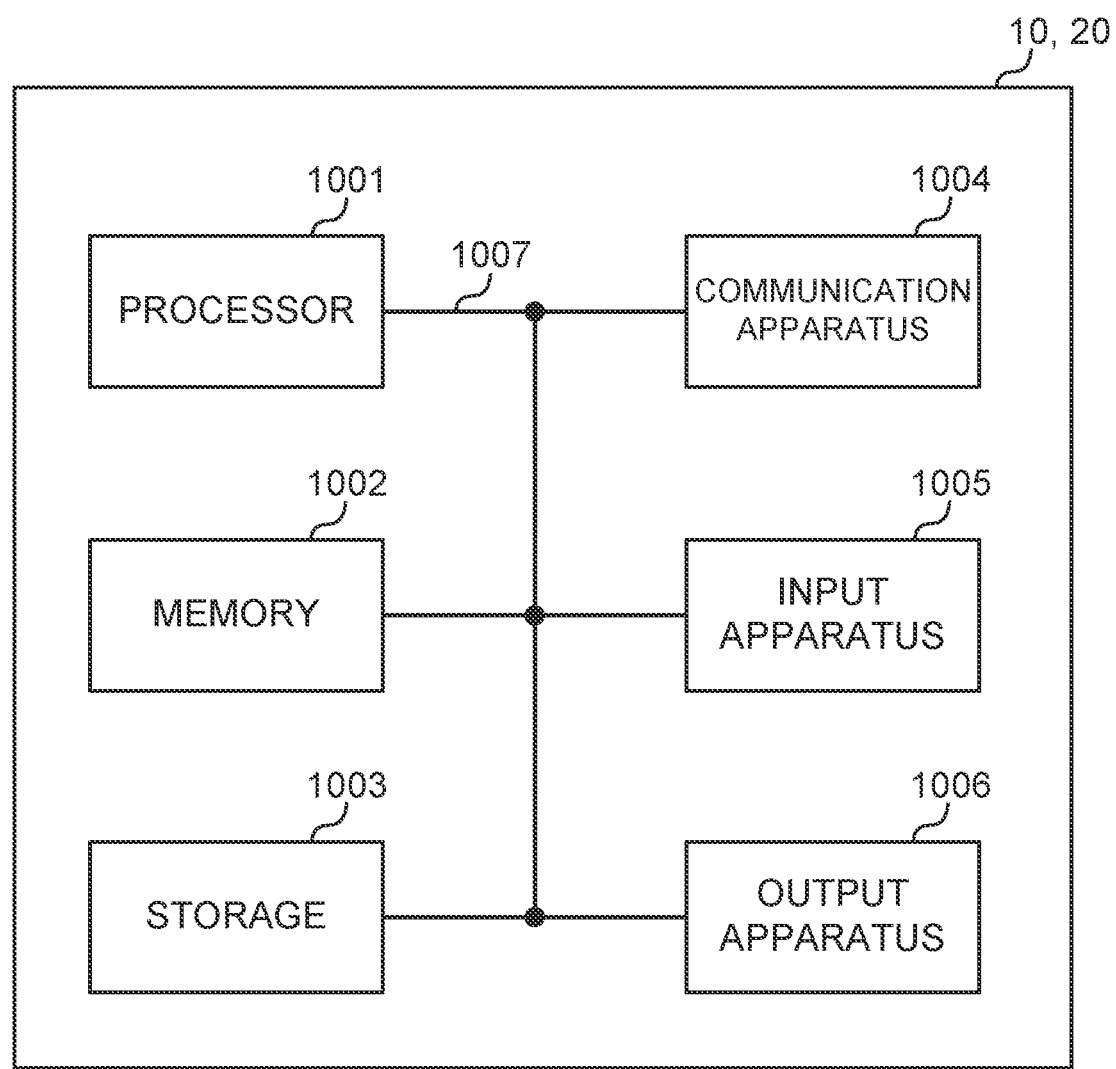
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

This application is based on Japanese Patent Application No. 2019-084682 filed on Apr. 9, 2019. The entire contents of the application are herein incorporated.

What is claimed is:

1. A terminal comprising:
a receiver that receives downlink control information (DCI) used for scheduling of a downlink shared channel corresponding to a plurality of code division multiplexing (CDM) groups; and
a processor that, when information indicating that a transmission configuration indication (TCI) field is present in the DCI is not configured, determines a TCI state of the downlink shared channel based on a plurality of TCI states corresponding to a lowest codepoint among one or more codepoints of the field, each of the one or more codepoints being associated with TCI states,
wherein the plurality of TCI states that correspond to the lowest codepoint respectively correspond to TCI states of downlink shared channels of different CDM groups, and
wherein each of the one or more codepoints of the field is associated with the plurality of TCI states by using a radio resource control (RRC) parameter and a medium access control (MAC) control element.

2. A system comprising a terminal and a base station, wherein
the terminal comprises:
a receiver that receives downlink control information (DCI) used for scheduling of a downlink shared channel corresponding to a plurality of code division multiplexing (CDM) groups; and
a processor that, when information indicating that a transmission configuration indication (TCI) field is present in the DCI is not configured, determines a TCI state of the downlink shared channel based on a plurality of TCI states corresponding to a lowest codepoint among one or more codepoints of the field, each of the one or more codepoints being associated with TCI states,
wherein the plurality of TCI states that correspond to the lowest codepoint respectively correspond to TCI states of downlink shared channels of different CDM groups, and
wherein each of the one or more codepoints of the field is associated with the plurality of TCI states by using a radio resource control (RRC) parameter and a medium access control (MAC) control element, and
the base station comprises:
a transmitter that transmits, to the terminal, the DCI.

* * * * *